(12) United States Patent
Hanigan

(10) Patent No.: US 10,719,808 B2
(45) Date of Patent: Jul. 21, 2020

(54) VIDEO ASSISTED HIRING SYSTEM AND METHOD

(71) Applicant: Maury Hanigan, New York, NY (US)

(72) Inventor: Maury Hanigan, New York, NY (US)

( * ) Notice: Subject to any disclaimer, the term of this patent is extended or adjusted under 35 U.S.C. 154(b) by 634 days.

(21) Appl. No.: 14/871,092

(22) Filed: Sep. 30, 2015

(65) Prior Publication Data
US 2016/0098685 A1 Apr. 7, 2016

Related U.S. Application Data

(60) Provisional application No. 62/058,321, filed on Oct. 1, 2014.

(51) Int. Cl.
*G06Q 10/00* (2012.01)
*G06Q 10/10* (2012.01)

(52) U.S. Cl.
CPC .................. *G06Q 10/1053* (2013.01)

(58) Field of Classification Search
CPC .... G06F 3/1256; G06F 3/1208; G06F 17/211; G06F 17/218; G06F 17/2229; G06F 17/2247; G06F 17/2264; G06F 17/24; G06F 17/248; G06F 16/955; G06F 16/972; G06F 3/1204; G06F 3/1215; G06F 3/1282; G06F 3/1296; G06F 17/2705; G06F 19/3418; G06F 21/32; G06F 3/1285; G06F 3/1286; G06F 16/40; G06F 16/738; G06F 16/7867; G06F 16/958; G06F 17/243; G06F 21/608; G06F 21/6227; G06F 21/6263; G06F 3/1203; G06F 3/1219; G06F 3/1222; G06F 3/1238; G06F 3/1244; G06F 3/125; G06F 3/126; G06F 3/1262; G06F 3/1288; G06F 3/1423; G06F 16/00; G06F 16/285; G06F 16/435; G06F 16/4393; G06F 16/487; G06F 16/489; G06F 16/954; G06F 17/22; G06F 17/2827; G06F 19/324; G06F 21/60; G06F 21/6209; G06F 3/1205; G06F 9/451; G06F 9/454; G06Q 30/02; G06Q 10/10; G06Q 20/12; G06Q 10/06; G06Q 20/04;
(Continued)

(56) References Cited

U.S. PATENT DOCUMENTS

| | | | | |
|---|---|---|---|---|
| 5,832,497 | A * | 11/1998 | Taylor | G06Q 10/10 |
| 6,185,587 | B1 * | 2/2001 | Bernardo | G06F 40/14 715/234 |
| 8,126,904 | B1 * | 2/2012 | Bettinger | G06Q 10/06 707/758 |
| 8,566,722 | B2 * | 10/2013 | Gordon | G06F 16/735 715/721 |
| 2001/0032112 | A1 | 10/2001 | Linz | |
| 2002/0161814 | A1 | 10/2002 | Wical | |
| 2005/0060318 | A1 * | 3/2005 | Brickman, Jr. | G06Q 10/10 |

(Continued)

*Primary Examiner* — Gabielle A McCormick
(74) *Attorney, Agent, or Firm* — Carter, Deluca & Farrell LLP

(57) ABSTRACT

Methods, systems, and devices for implementing video assisted hiring using a web-based job posting platform are disclosed, including receiving a first set of data relating to a position including one or more of a job description, job title, salary, location, job type, schedule, travel requirements, and benefits, sending a request for video messages relating to the position to one or more of a hiring manager, a supervisor, a direct report, and a colleague, receiving a second set of data including additional information relating to the position, receiving an input as to whether the received video messages should be included in the job posting, and in response to an approval of the video messages, sending the job posting, including the first and second sets of data and the video messages, to a server to be made available for viewing by applicants.

13 Claims, 16 Drawing Sheets

(58) Field of Classification Search
CPC ...... G06Q 20/10; G06Q 30/04; G06Q 10/103;
G06Q 20/367; G06Q 20/382; G06Q
40/00; G06Q 10/107; G06Q 30/0233;
G06Q 40/02; G06Q 40/025; G06Q
20/102; G06Q 20/20; G06Q 20/40; G06Q
20/405; G06Q 30/0277; G06Q 30/0603;
G06Q 40/06; G06Q 50/16; G06Q 10/00;
G06Q 10/063; G06Q 10/063114; G06Q
10/06313; G06Q 10/0637; G06Q
10/06398; G06Q 20/00; G06Q 20/0453;
G06Q 20/0457; G06Q 20/14; G06Q
20/204; G06Q 20/28; G06Q 20/32; G06Q
20/3278; G06Q 20/347; G06Q 20/349;
G06Q 20/354; G06Q 20/4012; G06Q
20/425; G06Q 30/018; G06Q 30/0203;
G06Q 30/0214; G06Q 30/0236; G06Q
30/0239; G06Q 30/0242; G06Q 30/0271;
G06Q 30/0276; G06Q 30/0282; G06Q
30/06; G06Q 30/0601; G06Q 30/0635;
G06Q 40/125; G06Q 50/01; G06Q 50/08;
G06Q 50/265; G06Q 10/101; G06Q
10/1053; G06Q 30/0251; H04N 21/812;
H04N 21/4316
See application file for complete search history.

(56) References Cited

U.S. PATENT DOCUMENTS

| | | | |
|---|---|---|---|
| 2006/0036647 A1* | 2/2006 | Fichtner | G06Q 30/02 |
| 2006/0116894 A1 | 6/2006 | DiMarco | |
| 2007/0162323 A1 | 7/2007 | Gorham | |
| 2007/0239777 A1 | 10/2007 | Toomey | |
| 2008/0086413 A1* | 4/2008 | Malloy | G06Q 20/10 705/39 |
| 2009/0089124 A1 | 4/2009 | Henderson et al. | |
| 2009/0228323 A1* | 9/2009 | Ebrahimian | G06Q 10/06 705/321 |
| 2009/0240652 A1* | 9/2009 | Su | G06F 16/93 |
| 2009/0299785 A1* | 12/2009 | Savjani | G06Q 30/0214 705/321 |
| 2010/0177157 A1* | 7/2010 | Stephens | H04N 21/4223 348/14.03 |
| 2011/0289011 A1* | 11/2011 | Hull | G06Q 50/01 705/319 |
| 2012/0072957 A1* | 3/2012 | Cherukuwada | H04N 21/23412 725/93 |
| 2014/0358683 A1* | 12/2014 | Panicali | G06Q 30/0257 705/14.55 |
| 2015/0347975 A1* | 12/2015 | Kelly | G06Q 10/1053 705/321 |
| 2015/0347976 A1* | 12/2015 | Munzer | G06Q 10/1053 705/321 |

* cited by examiner

Set up your position information (1 of 3)  ⟵ 600

- 601 — Job Number
- 602 — Job Title
- 603 — Job Description
- 604 — Location
- 605 — Base Salary
- 606 — Total Cash Compensation
- 607 — Type
- 608 — Schedule (check all that apply)
- 609 — Benefits ☐ Telecommute (no office)   ☐ No Travel
☐ Occasional Work-from-home  ☐ Travel < 25%
                              ☐ Travel 25-50%
                              ☐ Travel > 50%

○ Standard
○ Review and Edit

Fig. 6

Position Set Up: Request Your Video Clips (Step 2 of 3)  ⟵ 700

- 701 — Hiring Manager Email    [Pull from library]
- 702 — Colleague #1 Email      [Pull from library]
- 703 — Colleague #2 Email      [Pull from library]
- 704 — Video Approver Email (this might be you)

Fig. 7

Add your compelling content (Step 3 of 3)

Showcase Text  (Select one)

○ Select from Library
○ Create: Top 3 Reasons to Work Here
○ Create: Best Things About This Job
○ Create: This job can lead to ...
○ Create custom text
○ Insert logo or company name Supporting Text  (Select one)

○ Select from Library
○ Create: Key Company Facts
○ Create: Location Highlights
○ Create: You should know ...
○ Create custom text
○ Insert company career site URL

Benefits Summary

|  | Yes | No |
|---|---|---|
| Health Insurance | ○ | ○ |
| Dental Insurance | ○ | ○ |
| Vision Insurance | ○ | ○ |

COPY LIST FROM ACCOUNT SET UP

Edit Approver Email

Text of Approver email with title of job inserted.

Edit Colleague #1 Email

Text of Colleague #1 email with title of job inserted.

Edit Hiring Manger Email

Text of Hiring Manager email with title of job inserted.

Video Library

Supporting Text Library

Showcase Library

Create Things You Should Know

*Things you should know ...*

Text

Characters Remaining: 500

[Cancel] [Save]

Fig. 12A

Create Top Three Reasons to Work Here

*Top 3 Reasons to Work Here*

1. 
Characters Remaining: 100

2. 
Characters Remaining: 100

3. 
Characters Remaining: 100

[Cancel] [Save]

Fig. 12B

Create Best Things About This Job

Best Things About This Job

1. _____
   Characters Remaining: 100

2. _____
   Characters Remaining: 100

3. _____
   Characters Remaining: 100

Create Custom Text

Lead In
_____
Characters Remaining: 100

Text
_____
_____
Characters Remaining: 500

Create Key Company Facts

Key Company Facts

Number of Employees

Headquarters Location

Total Annual Revenue

Upload picture  Browse

Create Location Highlights

Location Highlights

Upload picture  Browse

VIDEO ASSISTED HIRING SYSTEM AND METHOD

CROSS-REFERENCE TO RELATED APPLICATION

The present application claims the benefit of and priority to U.S. Provisional Patent Application No. 62/058,321, entitled VIDEO ASSISTED HIRING SYSTEM AND METHOD, filed on Oct. 1, 2014, the entire contents of which is incorporated herein by reference.

BACKGROUND

1. Technical Field

The present disclosure relates to web-based job posting platforms and, more particularly, to devices, systems, and methods for implementing video assisted hiring using a web-based job posting platform.

2. Description of Related Art

It is known in the art that there are employers who have vacant positions for which they seek applicants. Such employers may advertise these vacant positions in classified advertisements, on their company websites or other job posting boards. Applicants may view such job postings and apply for the advertised vacant positions. However, current systems for both the employer and the applicant are insufficient for the current state of technology. Further, current systems do not conform with how technologically adept individuals consume and review information being presented to them. The instant application is directed to addressing these and other shortcomings of the current systems.

SUMMARY

A video assisted hiring system using a web-based job posting platform provided in accordance with the present disclosure may include a server, an employer, and one or more applicant devices all connected via a network. The job posting platform includes one or more applications using a database for storing data relating to job postings which are created by the employer and made available via the server to applicants to be viewed via applicant devices.

Provided in accordance with the present disclosure is an apparatus for generating a job posting. In an aspect of the present disclosure, the apparatus comprises a processor and a memory including instructions which, when executed by the processor, configure the apparatus to receive a first set of data relating to a position including one or more of a job description, job title, salary, location, job type, schedule, travel requirements, and benefits, send a request for video messages relating to the position to one or more of a hiring manager, a supervisor, a direct report, and a colleague, receive a second set of data including additional information relating to the position, receive an input as to whether the received video messages should be included in the job posting, and in response to an approval of the video messages, send the job posting, including the first and second sets of data and the video messages, to a server to be made available for viewing by applicants.

In a further aspect of the present disclosure, the request for video messages includes a token.

In yet a further aspect of the present disclosure, the token associates the job posting and at least one of the hiring manager, supervisor, direct report, and colleague.

In another aspect of the present disclosure, the token is included in a link which, when accessed, opens a website forming part of a video message submission system, and access to the website is restricted by the token.

In a further aspect of the present disclosure, the website provides access to an all-inclusive video capturing, editing, and storing tool.

In another aspect of the present disclosure, the server operates a job posting platform which makes the job posting available to be viewed by applicants after receiving the job posting from the apparatus.

In yet another aspect of the present disclosure, the job posting, including the first and second sets of data and the video messages, is sent to a distributor service which in turn sends the job posting to the server.

Provided in accordance with the present disclosure is a method for generating a job posting. In an aspect of the present disclosure, the method comprises receiving a first set of data relating to a position including one or more of a job description, job title, salary, location, job type, schedule, travel requirements, and benefits, sending a request for video messages relating to the position to one or more of a hiring manager, a supervisor, a direct report, and a colleague, receiving a second set of data including additional information relating to the position, receiving an input as to whether the received video messages should be included in the job posting, and in response to an approval of the video messages, sending the job posting, including the first and second sets of data and the video messages, to a server to be made available for viewing by applicants.

In a further aspect of the present disclosure, the request for video messages includes a token.

In yet a further aspect of the present disclosure, the token associates the job posting and at least one of the hiring manager, supervisor, direct report, and colleague.

In another aspect of the present disclosure, the token is included in a link which, when accessed, opens a website forming part of a video message submission system, and access to the website is restricted by the token.

In a further aspect of the present disclosure, the website provides access to an all-inclusive video capturing, editing, and storing tool.

In another aspect of the present disclosure, the server operates a job posting platform which makes the job posting available to be viewed by applicants after receiving the job posting from the apparatus.

In yet another aspect of the present disclosure, the job posting, including the first and second sets of data and the video messages, is sent to a distributor service which in turn sends the job posting to the server.

Provided in accordance with the present disclosure is a non-transitory computer-readable storage medium storing a program for generating a job posting. In an aspect of the present disclosure, the program includes instructions which, when executed, cause a computer to receive a first set of data relating to a position including one or more of a job description, job title, salary, location, job type, schedule, travel requirements, and benefits, send a request for video messages relating to the position to one or more of a hiring manager, a supervisor, a direct report, and a colleague, receive a second set of data including additional information relating to the position, receive an input as to whether the received video messages should be included in the job posting, and in response to an approval of the video messages, send the job posting, including the first and second sets of data and the video messages, to a server to be made available for viewing by applicants.

In a further aspect of the present disclosure, the request for video messages includes a token.

In yet a further aspect of the present disclosure, the token associates the job posting and at least one of the hiring manager, supervisor, direct report, and colleague.

In another aspect of the present disclosure, the token is included in a link which, when accessed, opens a website forming part of a video message submission system, and access to the website is restricted by the token.

In a further aspect of the present disclosure, the website provides access to an all-inclusive video capturing, editing, and storing tool.

In another aspect of the present disclosure, the server operates a job posting platform which makes the job posting available to be viewed by applicants after receiving the job posting from the apparatus.

In yet another aspect of the present disclosure, the job posting, including the first and second sets of data and the video messages, is sent to a distributor service which in turn sends the job posting to the server.

Any of the above aspects and embodiments of the present disclosure may be combined without departing from the scope of the present disclosure.

BRIEF DESCRIPTION OF THE DRAWINGS

Various aspects and features of the present disclosure are described hereinbelow with references to the drawings, wherein:

FIG. 6 is an illustration of an example view for creating a job posting according to an embodiment of the present disclosure;

FIG. 7 is an illustration of a further example view for creating a job posting according to an embodiment of the present disclosure;

FIG. 8 is an illustration of a further example view for creating a job posting according to an embodiment of the present disclosure;

FIG. 9 is an illustration of a further example view for creating a job posting according to an embodiment of the present disclosure;

FIGS. 12A-F are illustrations of further example views for creating a job posting according to an embodiment of the present disclosure;

FIG. 13 is an illustration of a further example view for managing a job posting system according to an embodiment of the present disclosure;

FIG. 14 is an illustration of a further example view for managing a job posting system according to an embodiment of the present disclosure;

FIG. 18 is an illustration of a further example view for applying to a job posting according to an embodiment of the present disclosure.

DETAILED DESCRIPTION

Devices, systems, and methods for implementing video assisted hiring are provided in accordance with the present disclosure. Examples of such devices, systems incorporating such devices, and methods using the same as described below.

The disclosed system and method for implementing video assisted hiring using a web-based job posting platform includes at least a server hosting the web-based job posting platform, an employer terminal used to create a job posting including video messages, and an applicant terminal used to view the job posting and send an application including a video message in response.

Figure 1:
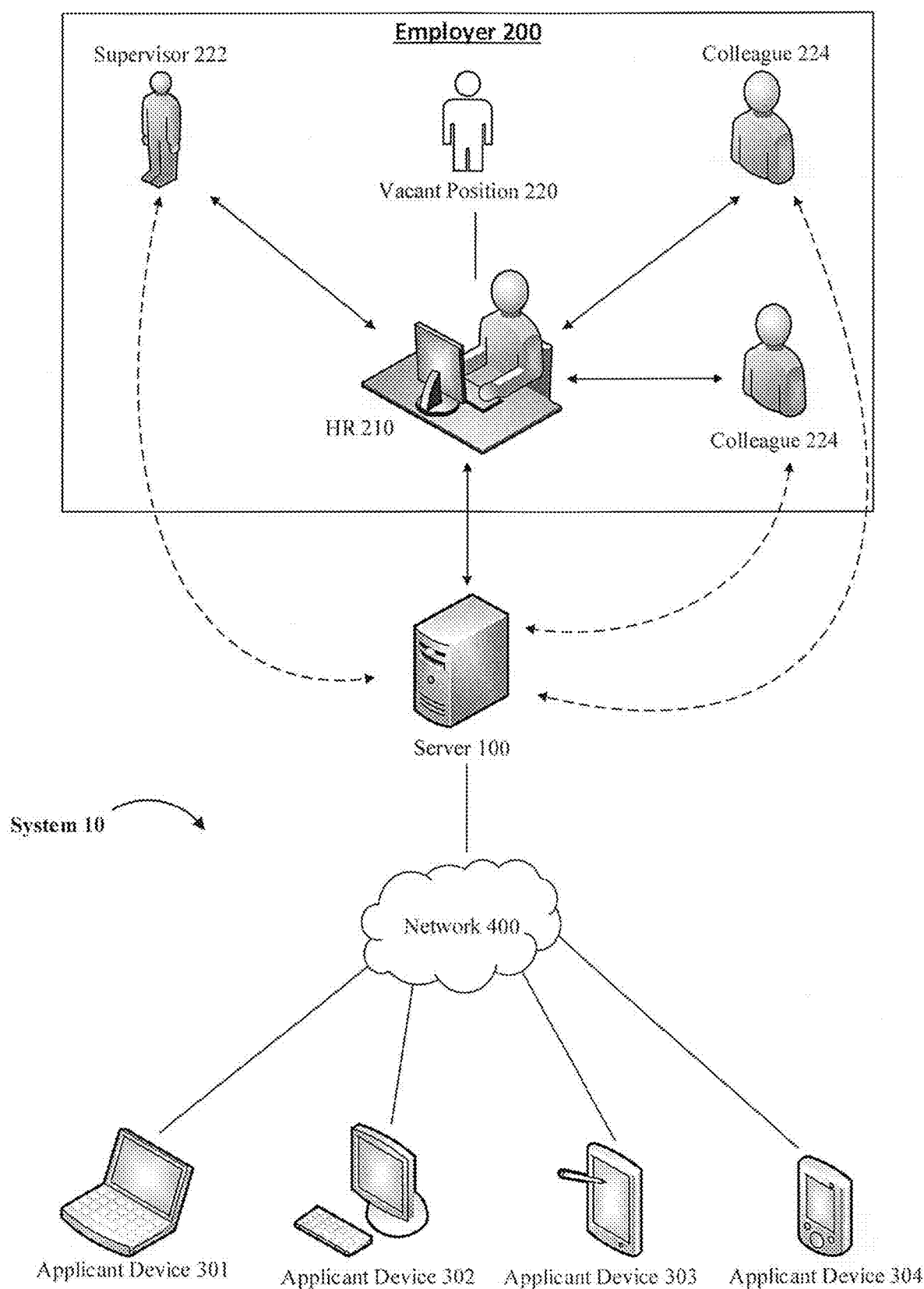
FIG. 1 is a system diagram illustrating an example system for operating a job posting platform provided in accordance with an embodiment of the present disclosure.

Referring now to FIG. 1, there is shown an example system 10 for implementing video assisted hiring in accordance with the present disclosure. System 10 includes a server 100 for hosting and operating a job posting platform, an employer 200 seeking applicants for a vacant position 220, and applicant devices 301, 302, 303, 304 all connected via a network 400.

Server 100 may be a single computer configured to operate as a server, an array of servers configured to operate in concert, a cloud-based server configuration, any combination of such servers, and/or any other servers or configurations known to those skilled in the art. Server 100 may be located at the facilities of employer 200, at the facilities of another entity that operates the job posting platform, and/or at a 3rd-party location such as a server farm or the cloud.

Figure 2:
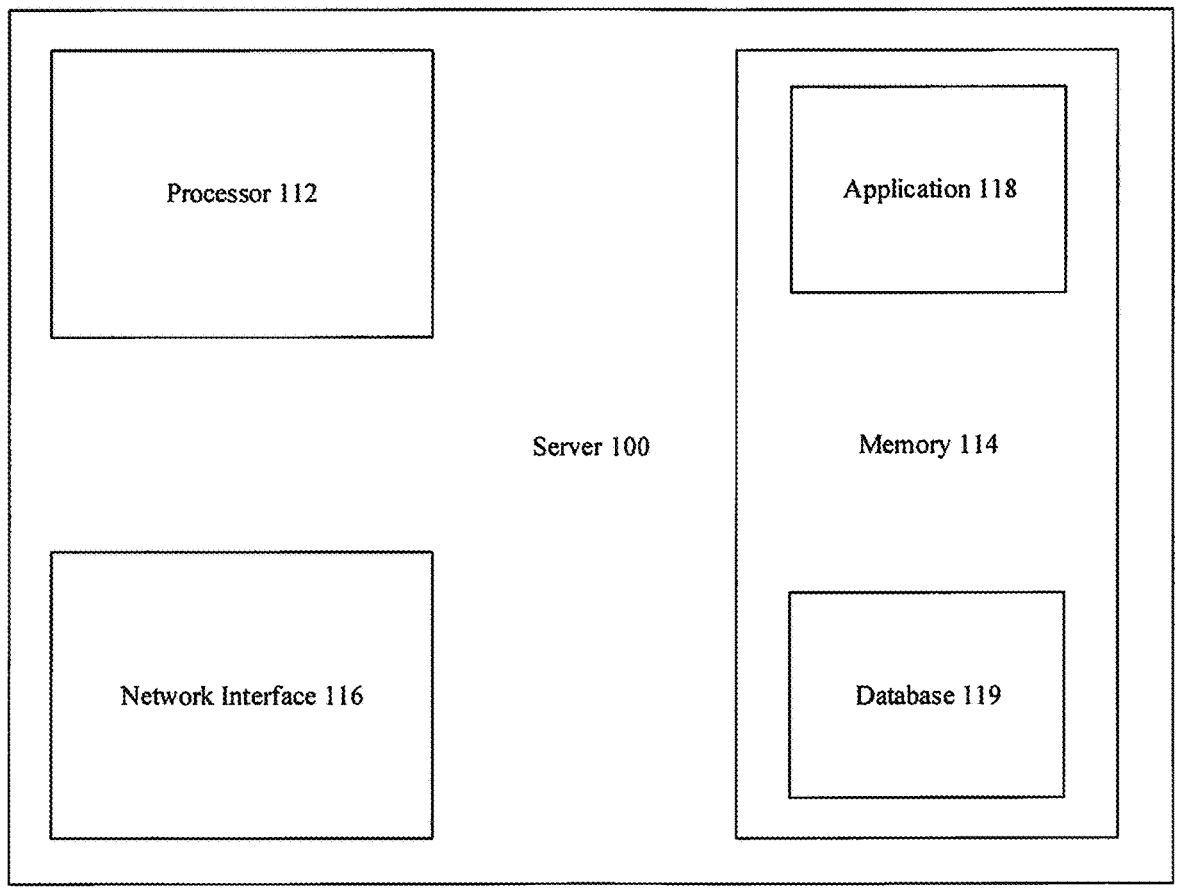
FIG. 2 is a schematic diagram illustrating an example hardware configuration for a server forming part of the system of FIG. 1.

As shown in FIG. 2, server 100 may include a processor 112, a network interface 116, and a memory 114 including an application 118 and a database 119. Memory 114 may be any non-transitory computer-readable storage media for storing data and/or software that is executable by processor 112 and which controls the operation of server 100. In an embodiment, memory 114 may include one or more solid-state storage devices such as flash memory chips. Alternatively or in addition to the one or more solid-state storage devices, memory 114 may include one or more mass storage devices connected to the processor 112 through a mass storage controller (not shown) and a communications bus (not shown). Although the description of computer-readable media contained herein refers to a solid-state storage, it should be appreciated by those skilled in the art that computer-readable storage media can be any available media that can be accessed by the processor 112. That is, computer readable storage media includes non-transitory, volatile and non-volatile, removable and non-removable media implemented in any method or technology for storage of information such as computer-readable instructions, data structures, program modules or other data. For example, computer-readable storage media includes RAM, ROM, EPROM, EEPROM, flash memory or other solid state memory technology, CD-ROM, DVD, Blu-Ray or other optical storage, magnetic cassettes, magnetic tape, magnetic disk storage or other magnetic storage devices, or any other medium which can be used to store the desired information and which can be accessed by server 100. Network interface 116 may be connected to one or more of a wired network, a wireless network, a BLUETOOTH™ network, or any other network type known to those skilled in the art.

Referring again to FIG. 1, the job posting platform may be hosted and operated by server 100 and may include application 118 configured to receive job postings and store the relevant data in database 119. The job posting platform may also make job postings available to be viewed by applicants via applicant devices 301, 302, 303, 304. For example, job postings may include basic information relating to vacant position 220, such as a job description, salary, location, job type, travel requirements, schedule, and/or benefits. In addition, job postings may include video messages relating to vacant position 220. Those skilled in the art will appreciate that additional information relating to vacant position 220 may also be included in the job postings without departing from the scope of this application.

Employer 200 may further include a human resources employee (HR) 210, a supervisor 222, and one or more colleagues 224. In some embodiments the job posting may be created and managed by HR 210, with supervisor 222 and colleagues 224 communicating only with HR 210, and HR 210 being the sole point of contact with server 100. Alternatively, in another embodiment, supervisor 222 and colleagues 224 may communicate directly with server 100. As described in more detail below, HR 210 may create a job posting relating to vacant position 220 using the job posting platform hosted by server 100, and may request video messages from supervisor 222 and colleagues 224. As will be appreciated by those of skill in the art, the communications with server 100 and HR 210 may be accomplished using any network enabled device including but not limited to a desktop computer, laptop, tablet, smartphone, smartwatch and others known or envisioned by one of skill in the art. As will be described in detail below, a network connection and the ability to capture and transmit a video are the necessary functions of such a device.

HR 210 may be a single employee overseeing hiring and/or personnel management, or may be a group of employees working together in such capacity, such as a human resources department. HR 210 may further include employees outside of a human resources department who also have a role in hiring and personnel management, such as a hiring manager and/or approver of video messages. In an embodiment utilizing a human resources department, different employees working in such a human resources department may have different responsibilities. For example, a lower-level employee may be tasked with creating a job posting via the job posting platform hosted by server 100, enter information relating to vacant position 220, and request video messages from supervisor 222 and colleagues 224, while a higher-level employee may be tasked with approving the job posting and requested video messages prior to making the job posting available to be viewed by applicants. In some embodiments, a single employee may be tasked with approving all job postings and video messages. In other embodiments, multiple different employees may play a role in approving job postings and video messages. In yet further embodiments, each job posting and/or video message may have a different approver.

In some embodiments, HR 210 creates the job posting and enters the information relating to vacant position 220 directly into server 100. In other embodiments, a distributor service may be used. The distributor service may collect information about various vacant positions and, once approved, distribute the information to one or more job posting platforms, essentially acting as an intermediary. In such other embodiments, employer 200 may have an internal applicant tracking system wherein information about some or all of the vacant and filled positions at employer 200 are stored. HR 210 may enter new information or select and review previously entered information regarding vacant position 220 when creating a job posting. The information may then be sent to the distributor service, which may in turn send the information to server 100. When the information reaches server 100, HR 210 may review the information and/or enter further information relating to vacant position 220 to create the job posting.

In yet a further embodiment of the present disclosure, once a video for a particular type of position has been approved it may be stored in a library of approved videos. As a result when the same position, or a very similar position, needs to be filled at some point in the future, there is no need to request a new video be created, rather the existing video can be identified and attached to the job posting. Such an embodiment is particularly useful for entities having a larger number of a particular type of position (e.g., secretaries, programmers, technicians, etc.) where the turnover and the expected rate of hiring can be expected to be relatively high.

Network 400 may be a local area network (LAN), a personal area network (PAN), a wide area network (WAN), the Internet, and/or any other network or combination of networks known to those skilled in the art. Network 400 may be configured to operate via wired, wireless, BLUETOOTH™, and/or any other protocols or configurations known to those skilled in the art.

Applicants may access the job posting platform hosted by server 100 and view the job postings made available by employer 200 via a device such as applicant devices 301, 302, 303, 304. Applicant devices 301, 302, 303, 304 may be any electronic device configured to access a web based platform, such as a personal computer (PC), personal digital assistant (PDA), smartphone, laptop, tablet, and/or a wearable computer such as a smartwatch, etc. Applicant devices 301, 302, 303, 304 may be configured to access the job posting platform hosted by server 100 via the internet by using a web browser, or may have installed in applicant devices 301, 302, 303, 304 an application configured to access application 118 of server 100.

As will be appreciated by those skilled in the art, it is envisioned that, in some embodiments, system 10 may be configured to operate entirely within the intranet of a company or organization, with server 100, employer 200, network 400, and applicant devices 301, 302, 303, 304 all contained within the same entity, wherein the job posting platform will be configured solely for internal use within the company or organization, and the applicants may already be other employees of employer 200. Alternatively, in other embodiments, some, or all, of server 100, employer 200, network 400, and applicant devices 301, 302, 303, 304 may be independent of each other and the applicants may not yet be associated with employer 200.

Figure 3:
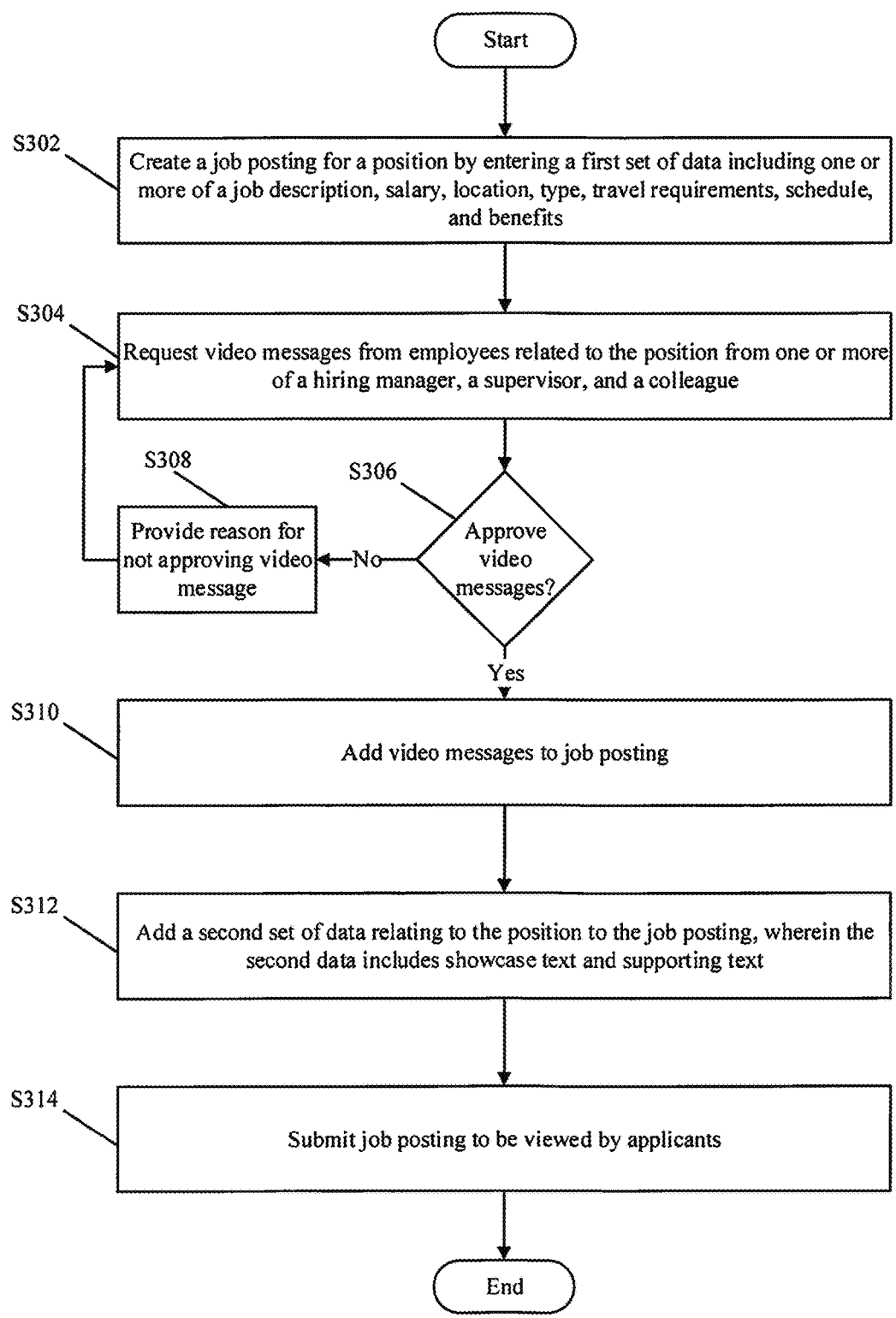
FIG. 3 is a flowchart illustrating an example method for creating a job posting according to an embodiment of the present disclosure.

Referring now to FIG. 3, there is shown a flowchart illustrating an example method for creating a job posting according to an embodiment of the present disclosure. At step S302, HR 210 may create a job posting relating to vacant position 220 by entering a first set of data including information such as a job description, salary, location, job type, travel requirements, schedule, and benefits relating to vacant position 220.

At step S304, HR 210 may request video messages relating to vacant position 220 from other employees related to vacant position 220, such as a hiring manager, supervisor 222, a direct report, and/or colleagues 224. HR 210 may request the video messages by sending an email message containing a link to a video message submission system, which may be an all-inclusive video capturing, editing, and storing tool, or simply a link to a location where the completed video message should be uploaded. The all-inclusive video capturing, editing, and storing tool may be a web-hosted application which is accessible via a web browser and does not require a user to download, install, or load any local software on the device used to access the tool. By using such a linking system, video messages may be uploaded to the job posting platform without needing any special software or access credentials to the job posting platform. Further, the linking system may use a content matching system, such as tokenization or any similar system known to those skilled in the art, whereby video messages are matched and associated with the job postings for which they are created without needing any further input from HR 210, supervisor 222, and/or colleagues 224.

For example, when HR 210 requests video messages related to vacant position 220, an email including a link may be sent to the other employees related to vacant position 220. The link included in the email may include a token associated with the job posting. Further, each email may include a unique token creating an association between the job posting and a single other employee related to vacant position 220. When the other employee opens the link, the other employee is taken to a website forming part of the video message submission system which is uniquely associated with that other employee by the token and which cannot be accessed by anyone else. By using this approach, the other employee does not need to sign in to an account on the job posting platform, and in fact, may not even need an account, to upload the requested video messages, because the other employee is taken directly to the website. Thus, the token takes the place of a user account, but maintains the association between the other employee and the job posting.

Thereafter, at step S306, upon receiving the requested video messages, HR 210 decides whether or not to approve the received video messages. If HR 210 decides not to approve a video message, at step S308, HR 210 may provide a reason for not approving one or more of the video messages, and processing may return to step S304. If HR 210 decides to approve the video messages, processing proceeds to step S310 where the video messages are added to the job posting.

At step S312, HR 210 may enter a second set of data relating to vacant position 220 and add the second set of data to the job posting. As described in more detail below with reference to FIGS. 12A-F, the second set of data may include showcase text and supporting text including such information as "Things You Should Know," "Top Three Reasons to Work Here," "Best Things About This Job," key facts about the company, location highlights, and custom text entered by HR 210. The second set of data may further include instructions on how to apply for vacant position 220, and/or questions to answer in a video message responding to the job posting. Thereafter, at step S314, the job posting may be submitted to server 100 to be made available to be viewed by applicants. HR 210 may also preview all the entered data and/or the completed job posting prior to submission to server 100.

Figure 4:
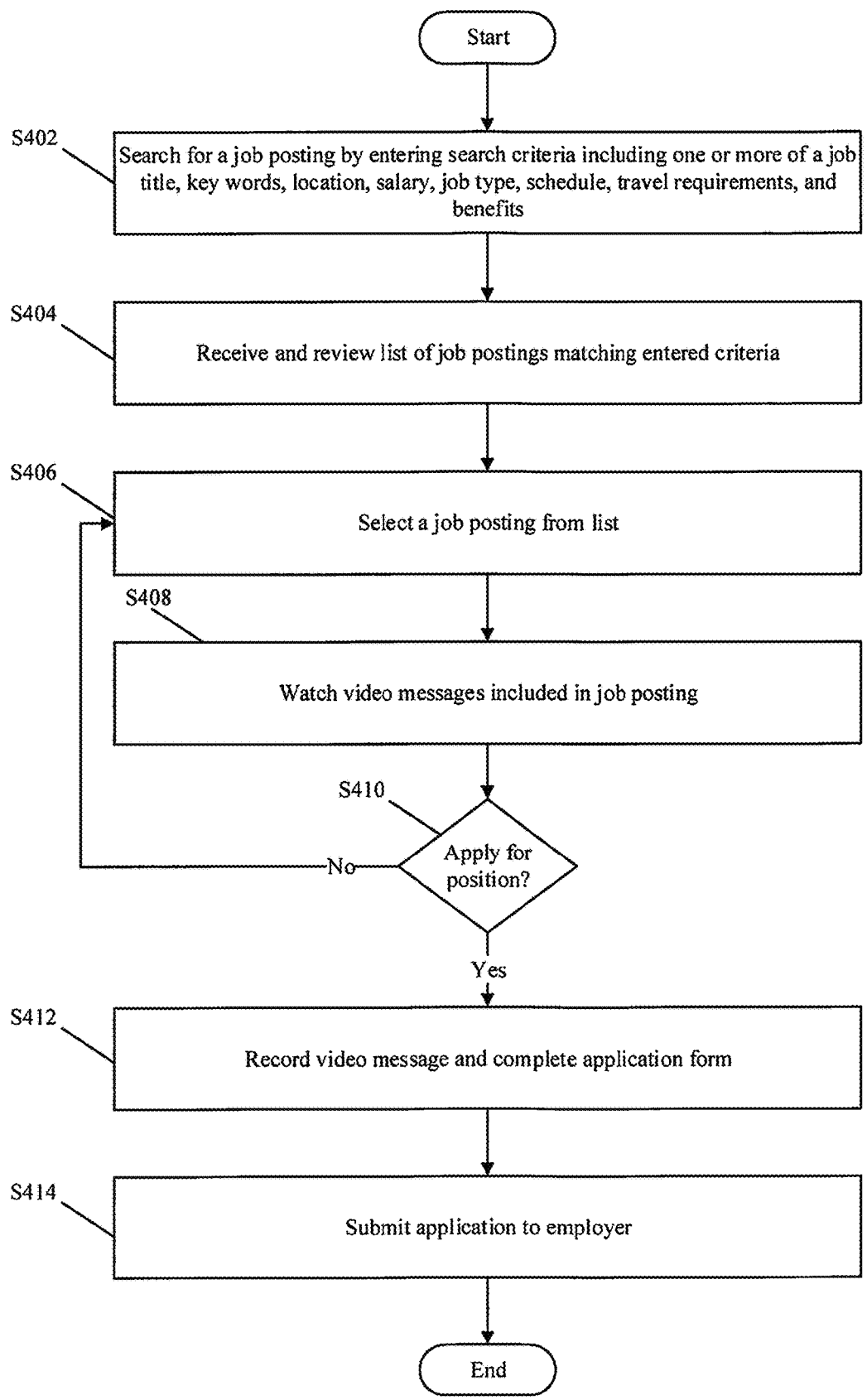
FIG. 4 is a flowchart illustrating an example method for applying to a job posting according to an embodiment of the present disclosure.

Referring now to FIG. 4, there is shown a flowchart illustrating an example method of using the job posting platform to apply to a job posting, according to an embodiment of the present disclosure. At step S402, an applicant, using one or more of applicant devices 301, 302, 303, 304, may search for a job posting by entering search criteria including one or more of a job title, key words, location, salary, job type, schedule, travel requirements, and/or benefits. Thereafter, at step S404, applicant devices 301, 302, 303, 304 may receive from server 100 a list of job postings matching the entered search criteria, and the applicant may review the received list. Job postings will listed in an ordered list based on criteria such as the number of matching elements contained in the search.

At step S406, the applicant may select a job posting from the list, and, at step S408, the applicant may watch video messages included in the selected job posting. Thereafter, at step S410, the applicant decides whether or not to apply to the vacant position advertised in the job posting. If the applicant decides not to apply, processing returns to step S406. If the applicant does decide to apply, processing proceeds to step S412, where the applicant records a video message in response to the job posting and completes an application form. The applicant may also send in a standard application to employer 200, or contact employer 200 regarding vacant position 220 via contact information included in the job posting. Thereafter, at step S414, the applicant submits an application for vacant position 220, including the application form and video message, to employer 200.

Figure 5:
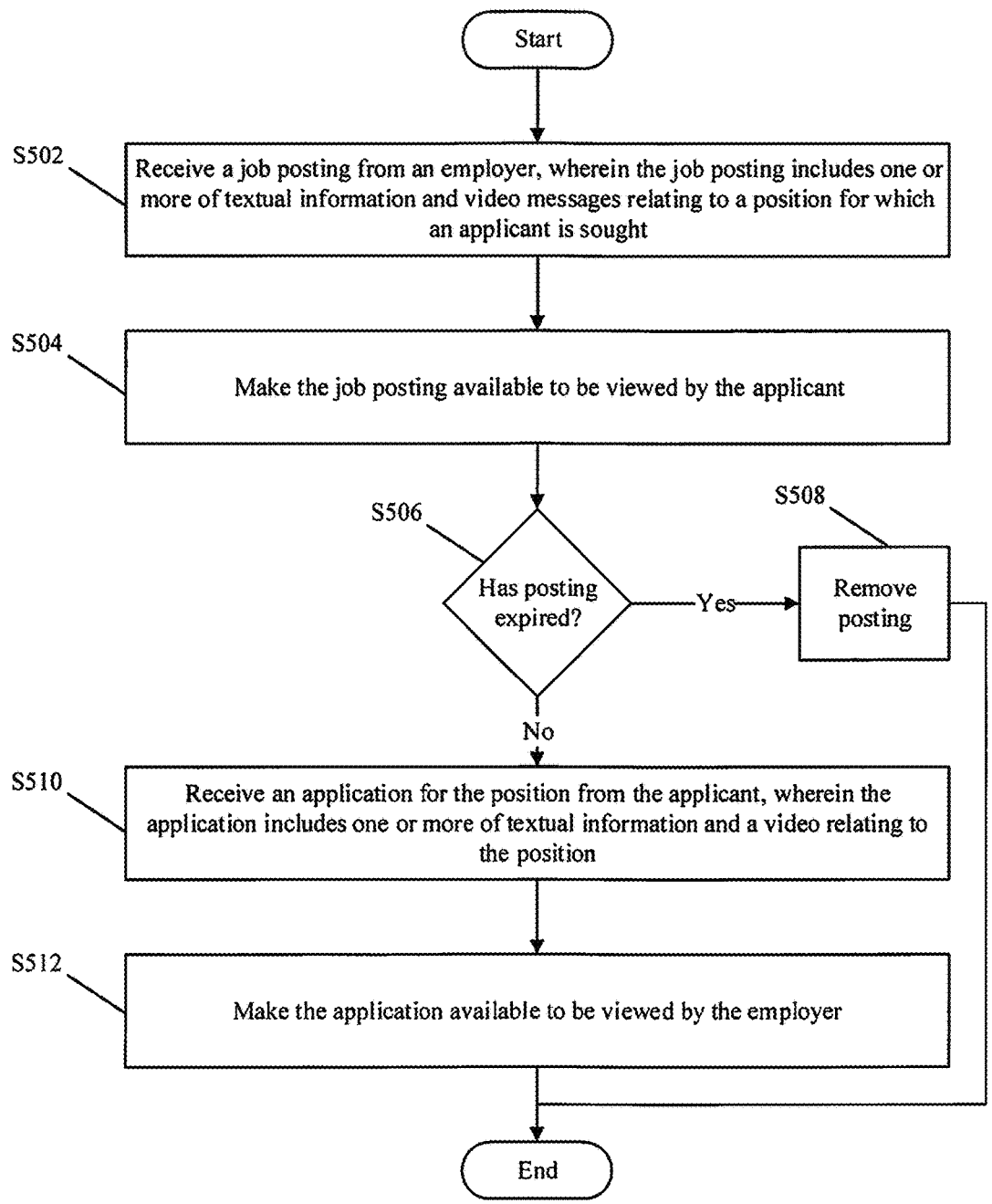
FIG. 5 is a flowchart illustrating an example method for operating a job posting platform according to an embodiment of the present disclosure.

Referring now to FIG. 5, there is shown an example method of operating a web based job posting platform according to an embodiment of the present disclosure. At step S502, server 100 may receive a job posting from employer 200. The job posting may include textual information and/or video messages relating to vacant position 220. Server 100 will confirm, prior to making a received job posting available to be viewed by applicants, that the received job posting includes all the required information and, as described in more detail below, that all required data fields have been entered, that all required video messages have been received, and that all received video messages have been approved.

At step S504, server 100 makes the received job posting available to be viewed by applicants. Server 100 monitors the job posting, and, at step S506, determines whether the time allotted for the job posting to be made available has expired. If the time has expired, server 100, at step S508, removes the job posting, thus making it unavailable to be viewed by applicants. If the time has not expired, processing proceeds to step S510 where server 100 may receive an application for vacant position 220 advertised in the job posting or include a link to employer 200's applicant tracking system so that an applicant may enter his/her application directly into employer 200's database, or provide an application that can be emailed to the email address of employer 200's designation. The application may include textual information and/or a video message. Thereafter, at step S512, server 100 makes the application available to be viewed by employer 200.

Server 100 may also keep a record of the number of times that a particular job posting has been viewed, and may keep a record of the addresses, such as Internet Protocol (IP) addresses of applicant devices 301, 302, 303, 304 that viewed a particular job posting, as well as the geographic locations from which a job posting has been viewed, and any other relevant data that may be recorded and tracked by server 100 regarding the job posting. Server 100 may compile statistics using such records, and may make such records and/or statistics available to employer 200.

It will be appreciated by those skilled in the art that the above-described methods are merely examples, and that some of the steps described may be omitted or performed in a different order than described. Similarly, additional steps may be added to these methods without departing from the scope or intent of the present disclosure.

The following description of FIGS. 6-18 includes example output views of the job posting platform hosted by server 100. As noted below, these views may be presented to the various persons occupying the positions disclosed via the various devices disclosed. However, it is envisioned that these views may also be presented to other persons and via other devices without departing from the scope or intent of the present disclosure.

Referring now to FIG. 6, there is shown an example view 600 for creating a job posting to be presented to HR 210. View 600 may include fields for entering a job number 601, job title 602, job description 603, location 604, base salary 605, total cash compensation 606, type 607, schedule 608, and/or benefits 609. HR 210 may enter data and/or use preconfigured menus included in fields 601-609 to configure the job posting.

Referring now to FIG. 7, there is shown an example view 700 for creating a job posting to be presented to HR 210. View 700 may include fields for entering a hiring manager's email address 701, as well as fields 702, 703 for entering the email addresses of colleagues related to vacant position 220, and a field 704 for entering the email address of the person who will be reviewing video messages related to the job posting, or selecting an email address from a prepopulated list of email addresses.

Referring now to FIG. 8, there is shown an example view 800 for creating a job posting to be presented to HR 210. View 800 allows HR 210 to select showcase text and supporting text (described in more detail below with reference to FIGS. 12A-F), to be included in the job posting. For example, HR 210 may make a selection to include showcase text and supporting text previously entered and stored in database 119, or may create new showcase text and supporting text.

Referring now to FIG. 9, there is shown an example view 900 for creating a job posting to be presented to HR 210. View 900 allows HR 210 to select the benefits which will be included in the employment package.

Figure 10A:
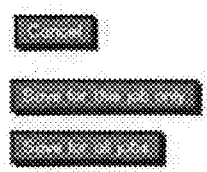
FIGS. 10A-C are illustrations of further example views for creating a job posting according to an embodiment of the present disclosure.
Figure 10B:
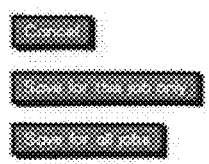
Figure 10C:
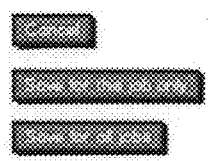

Referring now to FIGS. 10A-C, further example views are shown for creating a job posting to be presented to HR 210. FIGS. 10A-C present views allowing HR 210 to enter text to be included in email messages to be sent to the addresses entered in fields 701-704 of FIG. 7. FIG. 10A provides the field for the approver, corresponding to the address entered in field 704 of FIG. 7. FIG. 10B provides the field for colleagues, corresponding to fields 702, 703 of FIG. 7. FIG. 10C provides the field for the hiring manager, corresponding to field 701 of FIG. 7. These fields may be prepopulated with some or all of the data entered into fields 601-609 of FIG. 6, thereby simply allowing HR 210 to edit the prepopulated text.

Figure 11A:
FIGS. 11A-C are illustrations of further example views for creating a job posting according to an embodiment of the present disclosure.
Figure 11B:
Figure 11C:

Referring now to FIGS. 11A-C, further example views are shown for creating a job posting to be presented to HR 210. FIGS. 11A-C present views allowing HR 210 to select data from a library stored in database 119 to be added to the job posting. FIG. 11A presents a view showing video messages that have been received and stored in database 119. The video messages may be arranged by the job title for which they were recorded, and/or the date on which they were recorded. HR 210 may also search for a particular video message by entering the email address of the person who recorded the message, whereafter a list is generated showing all the video messages recorded by that person arranged according to criteria indicating which job posting the video message was recorded for.

FIG. 11B presents a view showing a library of supporting text previously entered into the job posting platform and stored in database 119. For example, supporting text may be arranged by the job title for which it was entered, and/or the most recent date on which it was used. The stored supporting text may further be arranged and/or sorted by the type of supporting text included, for example, "Key Company Facts." FIG. 11C presents a view showing a library of showcase text previously entered into the job posting platform and stored in database 119. For example, showcase text may be arranged by the job title for which it was entered, and/or the most recent date on which it was used. The stored showcase text may further be arranged and/or sorted by the type of showcase text included, for example, "Top Three Reasons to Work Here."

Figure 12C:
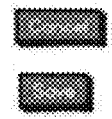

Referring now to FIGS. 12A-F, further example views are shown for creating a job posting to be presented to HR 210. FIGS. 12A-F present views allowing HR 210 to enter data to be used as showcase text and/or supporting text in the job posting. FIG. 12A presents a view allowing HR 210 to enter text regarding things an applicant should know about employer 200 and/or vacant position 220. FIG. 12B presents a view allowing HR 210 to enter text regarding the "Top Three Reasons to Work Here." FIG. 12C presents a view allowing HR 210 to enter text regarding the "Best Things About This Job."

Figure 12D:
Figure 12E:
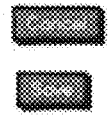
Figure 12F:

FIG. 12D presents a view allowing HR 210 to enter custom text, including heading and description fields. FIG. 12E presents a view allowing HR 210 to enter text regarding "Key Company Facts." FIG. 12F presents a view allowing HR 210 to enter text regarding "Location Highlights."

Figures 13, 14:
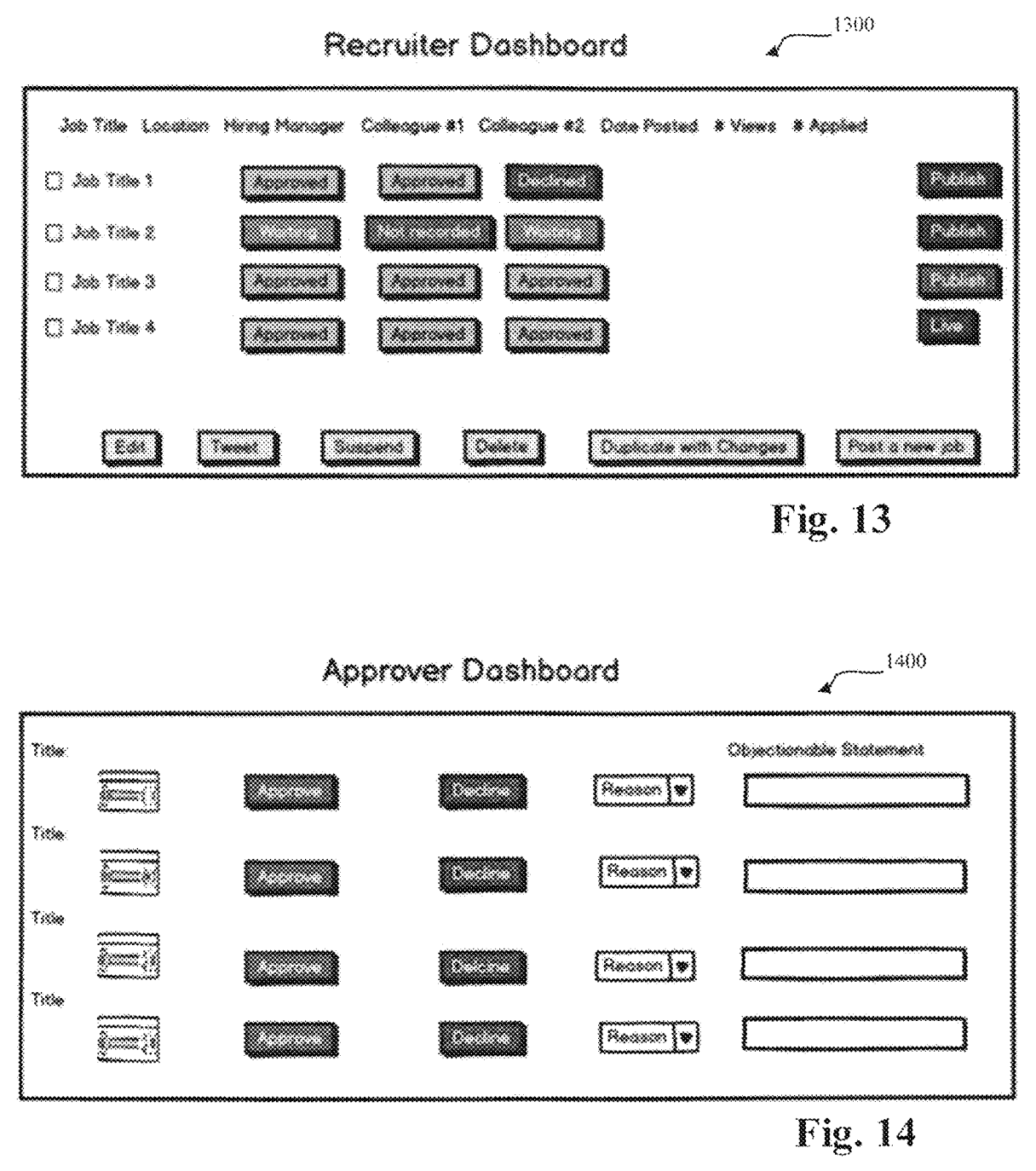

Referring now to FIG. 13, there is shown an example view 1300 for managing a job posting system. View 1300 presents a recruiter dashboard to HR 210 allowing HR 210 to review the status of created job postings. For example, view 1300 shows which job postings have video messages that have been approved, and/or declined, as well as which job postings have video messages that are awaiting review, and which have video messages outstanding. View 1300 further shows which job postings have been made available to be viewed by applicants, and which job postings are ready to be made available and which are still awaiting approval. View 1300 further presents buttons allowing HR 210 to edit job postings, send a tweet about a job posting, suspend and/or delete a job posting, duplicate a job posting with changes, and create a new job posting.

Referring now to FIG. 14, there is shown an example view 1400 for managing a job posting system. View 1400 presents an approver dashboard to HR 210 allowing HR 210 to review and approve received video messages. For example, view 1400 shows all the video messages that have been received for a particular job posting, allowing HR 210 to view the video messages, and select a button to either approve or decline a video message. Additionally, HR 210 may select and/or enter a reason for declining a video message.

Figure 15:
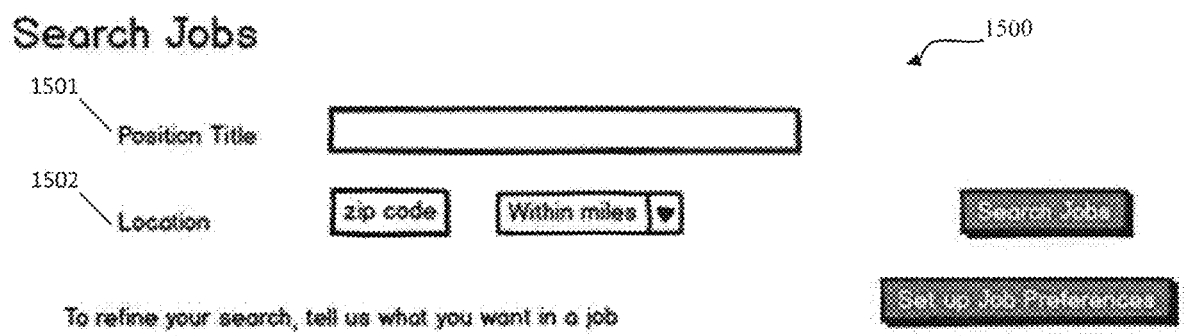
FIG. 15 is an illustration of an example view for applying to a job posting according to an embodiment of the present disclosure.

Referring now to FIG. 15, there is shown an example view 1500 for searching for a job posting to be presented to an applicant. View 1500 allows the applicant to search for job postings by a position title 1501 and a location 1502.

Figure 16:
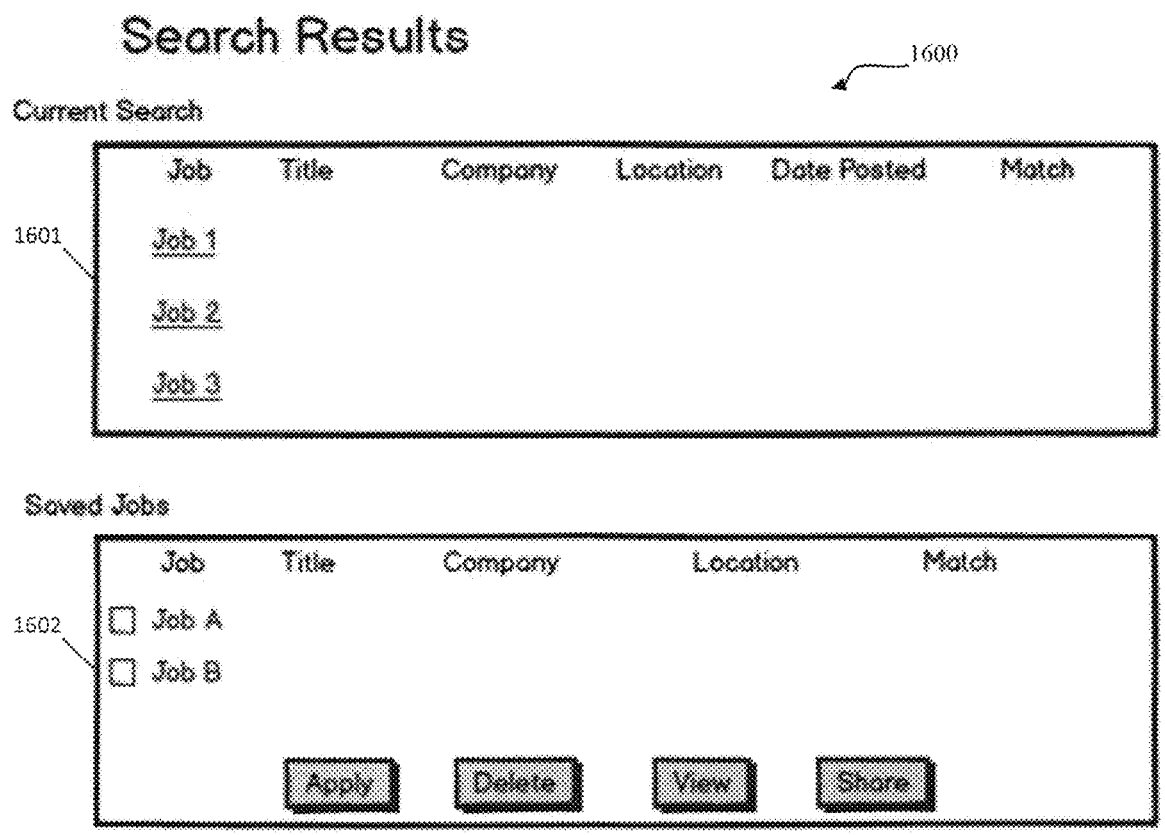
FIG. 16 is an illustration of a further example view for managing a job posting system according to an embodiment of the present disclosure.

Referring now to FIG. 16, there is shown an example view 1600 for selecting a job posting by an applicant. View 1600 presents the search results of a search performed by the applicant. View 1600 may include a current search field 1601 showing a list of job postings matching the search criteria entered in FIG. 15, including a posting title, job title, company, location, date on which the job posting was made available, and a match score. View 1600 may further include a saved jobs field 1602 showing a list of job postings the applicant has previously searched for and stored for future consideration. View 1600 allows the applicant to select a job posting, apply to the job posting, view a job posting, delete a saved job posting, and share a job posting with other applicants.

Figure 17:
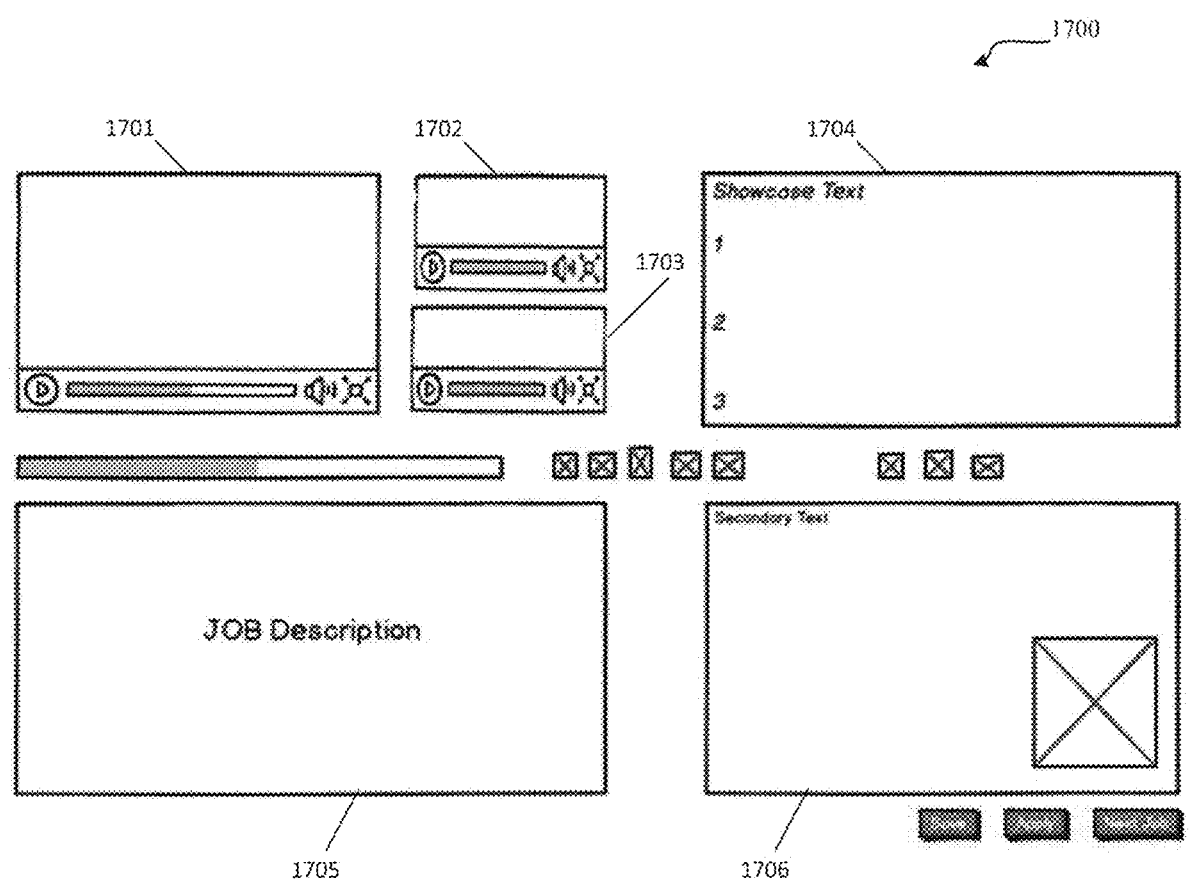
FIG. 17 is an illustration of a further example view for managing a job posting system according to an embodiment of the present disclosure.

Referring now to FIG. 17, there is shown an example view 1700 of a job posting to be presented to an applicant. View 1700 includes video messages 1701, 1702, 1703, as well as fields for showcase text 1704 and supporting text 1706, and a job description field 1705. View 1700 allows the applicant to view the video messages 1701, 1702, 1703, as well as the showcase text 1704, supporting text 1706, and job description 1705. After viewing, the applicant may select a button to either save the job posting, apply to the job posting, or go to the next job posting or share the job posting via social media such as Twitter, Facebook, LinkedIn, or Google+.

Figure 18:
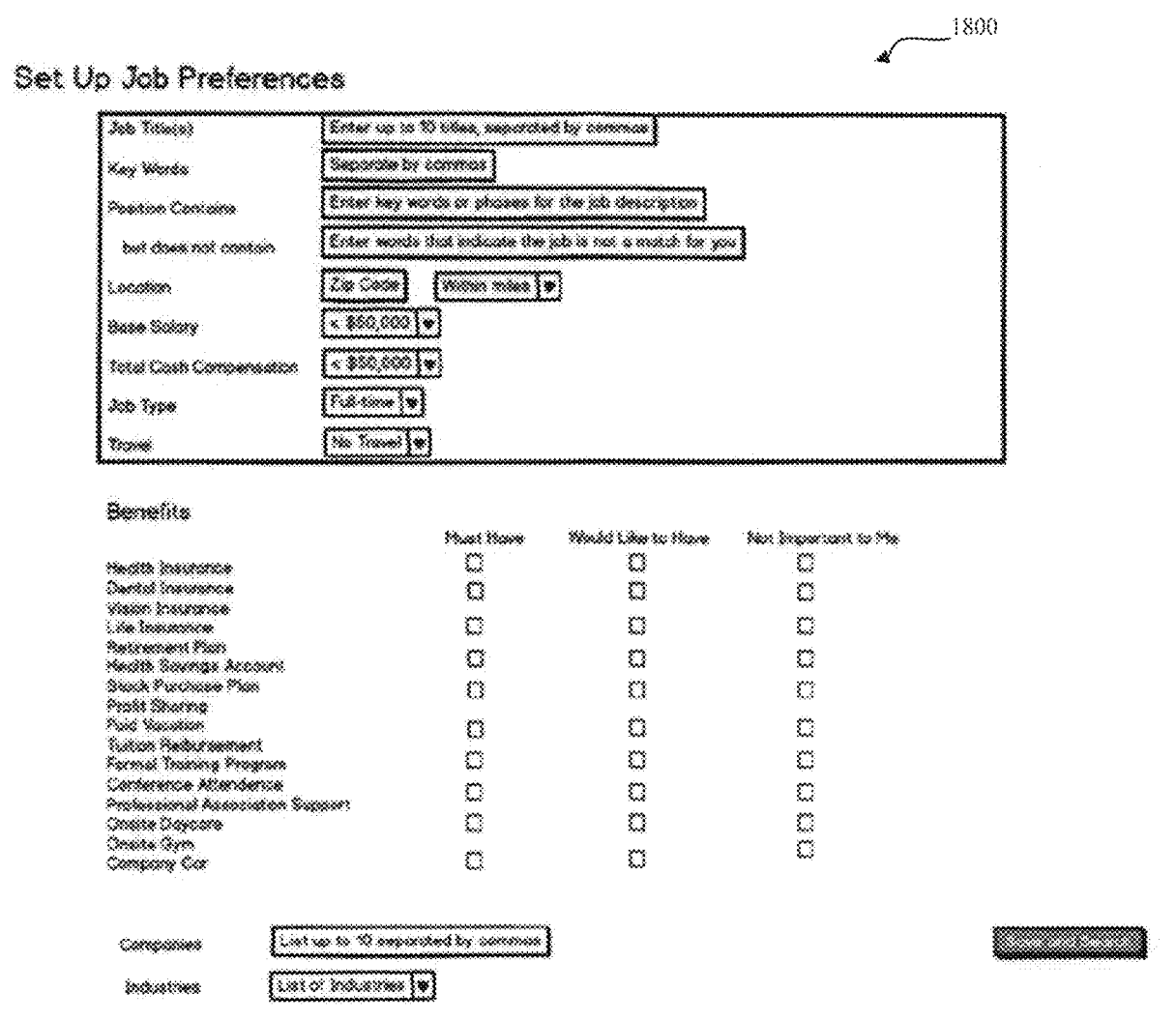

Referring now to FIG. 18, there is shown an example view 1800 for setting up preferences and search criteria to be presented to an applicant. View 1800 allows the applicant to enter data regarding the jobs the applicant is interested in searching for. For example, the applicant may enter data relating to one or more of a job title, key words, location, base salary, total cash compensation, job type, and travel requirements. View 1800 may also allow the applicant to select preferences regarding benefits provided.

Further, while the above disclosure is described with embodiments relating to a job posting platform, it is also envisioned that a content management system similar to that which is described above may be operated in other fields of use. For example, a content management system where videos are requested from individuals related to a particular task, project, or product, and those videos must subsequently be approved by an approver before the videos may be published on a platform. In one such envisioned embodiment, a company or organization may seek reviews relating to a product or service provided from customers or clients of such company or organization. Alternatively, the videos may be part of a promotion or contest where the videos are judged either by the content providing service or the public to determine a winner. In some instances the award may be given to all who submit a video for consideration, such as a customer loyalty award, etc.

The videos may be submitted by the customers or clients to the company or organization, whereafter a designated employee or employees of the company or organization (filling the role of HR 210 described above) may review the received videos for quality control purposes prior to publishing the videos on for example its website. These videos, as described above, may be simply part of a testimonial for an advertisement campaign, part of a publically voted on contest, or an advertising collage intended to depict individual stories about a product, service, or experience. Those skilled in the marketing and sales arts can identify and utilize these videos in any number of effective methods without departing from the scope of the present disclosure.

In another example embodiment, a content providing service, such as a broadcaster, may request that viewers or other members of the public submit video messages relating to a particular topic. The viewers may be directed to a website where they may create an account on a platform similar to the above-described job posting platform to upload the requested videos, whereafter the uploaded videos are curated by an employee of the broadcaster. As an alternative to establishing an account, tokenization may be used here to avoid an account-creation and login process and instead have the viewers go to a website, enter an email address to which a link is then sent, the link associating the view a particular video submission without the user having to create an account. In this manner the uploaded video may be associated with both the email address of the submitter and with the specific reason for the video (e.g., the specific contest) without requiring the recipient of the videos (e.g., the broadcaster) to undertake any identification and sorting of the videos following receipt. The video will automatically be associated with the contest or other reason for requesting them. In addition, using this approach, security is enhanced because, even without the viewers creating accounts, access to each video submission may be restricted to the person who is associated with a unique link by means of tokenization and the recipient (e.g., person filling role of HR 210 above) at the broadcaster.

While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

What is claimed is:

1. A system for generating and controlling a job posting, the system including a first computing device comprising a processor and a memory including instructions which, when executed by the processor, configure the first computing device to:
    receive input for creating a job posting including a first set of data relating to a position including a job description, job title, salary, location, job type, travel requirements, and benefits;
    determine an approver for a video message from a list of approvers based on the job posting;
    send a request to a second computing device, the request including a position token associated with the job posting, an email address of a submitter of the video message, a link, and information about the determined approver, wherein the link, when selected by the second computing device, exclusively allows the second computing device an access to and opens a website to form a video message, wherein the video message is associated with the job posting and a hiring manager is captured in the video message, and wherein the hiring manager makes a final hiring decision;
    receive a second set of data from the second computing device including information relating to the position and the video message;
    display on the second computing device an approver dashboard, wherein the approver dashboard includes the title of the job posting and a button for approving or denying inclusion of the received video message in the job posting;

receive an input approving or denying inclusion of the received video message in the job posting from the determined approver based on the approver dashboard; and in response to an approval of the received video message, send the job posting, including the first and second sets of data and the received video message, to a server to be made available for viewing by applicants, wherein the first computing device is in communication with the server, and the second computing device is not in communication with the server, and wherein the website provides access to an all-inclusive video capturing, editing, and storing tool and wherein the tool does not require a user to download, install, or load any local software on the user's device used to access the tool.

2. The system according to claim 1, wherein the processor associates the job posting and video messages, for which the request has been sent to the second computing device with the position, based on the position token.

3. The system according to claim 1, wherein the server operates a job posting platform which makes the job posting available to be viewed by applicants after receiving the job posting from the system and approval of the video message is received by the first computing device.

4. The system according to claim 1, wherein the job posting, including the first and second sets of data and the video message, is sent to a distributor service which in turn sends the job posting to the server.

5. The system according to claim 1, wherein the instructions when executed, further cause the first computing device to receive an input providing a reason for not approving the video message, in response to denying the inclusion of the received video message.

6. The system according to claim 3, wherein the instructions when executed, cause the server to:

receive an input indicating the approved job posting from a third computing device;

transmit the approved video message associated with the job posting to the third computing device;

receive a request to apply for the job posting from the third computing device;

send a request to the third computing device, the request including a second position token associated with the job posting, an email address of a submitter of the video message, and a second link, wherein the second link, when selected by the third computing device, exclusively allows the third computing device an access to and opens a website to form a second video message, wherein the video message is associated with the request to apply for the job posting;

receive a recorded second video message and an application from the third computing device; and transmit the second video message and the application to the second computing device for review and approval by the hiring manager.

7. A method of generating and controlling a job posting, the method comprising:

receiving input for creating a job posting at a first computing device including a first set of data relating to a position including a job description, job title, salary, location, job type, travel requirements, and benefits;

determining an approver for a video message from a list of approvers based on the job posting;

sending a request for video messages relating to the position to a second computing device, the request including a position token associated with the job posting, an email address of a submitter of the video message, a link, and information about the determined approver, wherein the link, when selected by the second computing device, exclusively allows the second computing device an access to and opens a website to form a video message, wherein the video message is associated with the job posting and a hiring manager is captured in the video message, and wherein the hiring manager makes a final hiring decision;

receiving at the first computing device, a second set of data from the second computing device including information relating to the position and the video message;

displaying on the second computing device an approver dashboard, wherein the approver dashboard includes the title of the job posting and a button for approving or denying inclusion of the received video message in the job posting;

receiving at the first computing device, input approving or denying inclusion of the received video message, from the determined approver based on the approver dashboard; and in response to an approval of the received video message, sending the job posting, including the first and second sets of data and the received video message, to a server to be made available for viewing by applicants, wherein the first computing device is in communication with the server, and the second computing device is not in communication with the server, and wherein the website provides access to an all-inclusive video capturing, editing, and storing tool and wherein the tool does not require a user to download, install, or load any local software on the user's device used to access the tool.

8. The method according to claim 7, further comprising associating the job posting and video messages, for which the request has been sent to the second computing device with the position, based on the position token.

9. The method according to claim 7, wherein the server operates a job posting platform which makes the job posting available to be viewed by applicants after receiving the job posting and approval of the video message is received by the first computing device.

10. The method according to claim 7, wherein the job posting, including the first and second sets of data and the video message, is sent to a distributor service which in turn sends the job posting to the server.

11. A non-transitory computer-readable medium storing a program for generating and controlling a job posting, the program including instructions which, when executed, cause a first computing device to:

receive input for creating a job posting including a first set of data relating to a position including a job description, job title, salary, location, job type, travel requirements, and benefits;

determine an approver for a video message from a list of approvers based on the job posting;

send a request to a second computing device, the request including a position token associated with the job posting, an email address of a submitter of the video message, a link, and information about the determined approver, wherein the link, when selected by the second computing device, exclusively allows the second computing device an access to and opens a website to form a video message, wherein the video message is associated with the job posting and a hiring manager is captured in the video message, and wherein the hiring manager makes a final hiring decision;

receive a second set of data from the second computing device including information relating to the position and the video message;

display on the second computing device an approver dashboard, wherein the approver dashboard includes the title of the job posting and a button for approving or denying inclusion of the received video message in the job posting;

receive an input approving or denying inclusion of the received video message, from the determined approver based on the approver dashboard; and in response to an approval of the received video message, further associate the position token with a second status that the video message is eligible for publishing, and send the job posting, including the first and second sets of data and the received video message, to a server to be made available for viewing by applicants, wherein the first computing device is in communication with the server, and the second computing device is not in communication with the server, and wherein the website provides access to an all-inclusive video capturing, editing, and storing tool and wherein the tool does not require a user to download, install, or load any local software on the user's device used to access the tool.

12. The non-transitory computer-readable medium according to claim 11, wherein the instructions further cause a first computing device to associate the job posting and video messages, for which the request has been sent to the second computing device with the position, based on the position token.

13. The non-transitory computer-readable medium according to claim 11, wherein the job posting, including the first and second sets of data and the video message, is sent to a distributor service which in turn sends the job posting to the server.

* * * * *